Jan. 27, 1970   A. J. YERMAN   3,491,588
STRAIN SENSITIVE TUNNEL DIODE
Filed Dec. 20, 1966   2 Sheets-Sheet 1

INVENTOR.
ALEXANDER J. YERMAN
BY R. H. Quist
ATTORNEY.

Jan. 27, 1970  A. J. YERMAN  3,491,588
STRAIN SENSITIVE TUNNEL DIODE
Filed Dec. 20, 1966  2 Sheets-Sheet 2

INVENTOR.
ALEXANDER J. YERMAN
BY
ATTORNEY.

United States Patent Office 3,491,588
Patented Jan. 27, 1970

3,491,588
STRAIN SENSITIVE TUNNEL DIODE
Alexander J. Yerman, Scotia, N.Y., assignor to General Electric Company, a corporation of New York
Filed Dec. 20, 1966, Ser. No. 603,323
Int. Cl. G01l 5/12
U.S. Cl. 73—141       2 Claims

ABSTRACT OF THE DISCLOSURE

A semiconductor substrate is formed as a structural member such as a cantilevered beam, with a tunnel diode junction formed at the location of maximum stress when the beam is loaded. The diode provides a frequency modulated output as a function of input force. The junction is formed on a particular crystal surface of the substrate, and the junction is stressed in the direction giving maximum sensitivity.

BACKGROUND OF THE INVENTION

This invention relates generally to semiconductor strain gauges and more particularly to a strain sensitive tunnel diode.

In the past use of tunnel diodes as transducers, i.e., sensing devices to detect physical changes, has been proposed. See, for example, U.S. Letters Patent 3,277,717. This approach has the advantage of providing a frequency modulated output having low susceptibility to degradation by background noise. Difficulty has been had in fabricating tunnel diodes with reproducible performance using the prior art techniques. In addition problems such as nonlinearity, fragility, and lack of stability have been experienced. One probable cause for some of these problems is that stress has previously been applied directly to the tunnel diode junction by a stylus which then generates anisotropic stresses in the junction.

SUMMARY

In a preferred form of the invention, the substrate crystal is fabricated in the form of a small cantilever beam of single crystal material. In the case of a beam of uniform cross section, a force applied at right angles to the free end of the cantilever beam generates maximum strain at the extreme outer fibers of the beam at a location approximately at the inner edge of the support. At this point, the tunnel diode junction is fabricated so that it is subjected to maximum strain for any force input applied to the free end of the cantilever beam.

Additionally, since the strain sensitivity of the tunnel diode is controlled by the crystal orientation of the substrate, that orientation is selected which will yield maximum strain sensitivity. For example, if the substrate is p-type germanium, a favorable combinaton is to fabricate the junction on a (100) surface and apply strain to the junction in a [001] direction.

DESCRIPTION OF THE PREFERRED EMBODIMENTS

Figure 1:
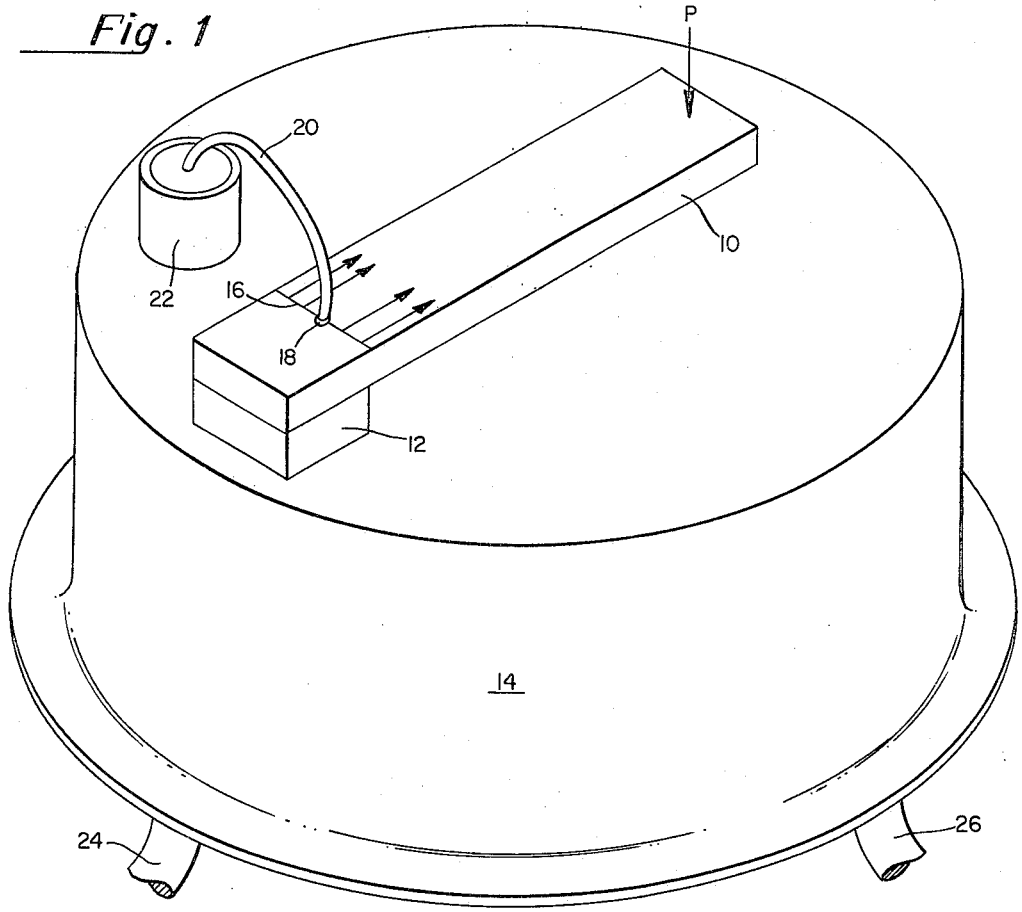
FIGURE 1 is an isometric of one embodiment of the invention.

In FIGURE 1 substrate 10 of a semiconductor material (for example germanium doped with gallium to form a p-type material), is secured to pedestal 12 at one end so as to constitute a cantilevered beam. Pedestal 12 is secured to supporting structure 14. Supporting structure 14 provides a convenient means for attaching the device to other apparatus and for making the necessary electrical connections, but its design is not critical. In the illustrated embodiment a case for a transistor has been used.

It will be recalled that a beam cantilevered as shown will experience maximum stress along line 16 defined by the tails of the arrows shown and in the direction of the arrows when the free end of cantilevered substrate 10 is depressed as by a force P. Line 16 is above the edge of pedestal 12. In accordance with the invention, tunnel diode junction 18 is fabricated on substrate 10 somewhere along line 16. In this manner the tunnel diode junction will experience the maximum strain possible (again in the direction of the arrows) resulting from the application of force P. At any location other than that described, the tunnel diode would be less strain sensitive to force P. Moreover, the use of a cantilever effectively multiplies force P by the lever arm ratio (the ratio of the length of the unsupported portion of the beam to one-half the beam thickness) so that forces which might be too small to strain the junction in other configurations, will cause a detectable change in the junction resistance in the configuration of this invention.

Junction 18 (which may be lead-indium doped with arsenic to form n-type material) is connected by conductor 20 to terminal 22 which is insulated from the transistor case, to which more sturdy conductor 24 is also connected. Conductor 26 is connected (through supporting structure 14) to substrate 10.

Although it has been stated that junction 18 is fabricated along line 16 it should be recognized that this is the ideal location. If, in fabrication, the desired exact location cannot be achieved with assurance, it is preferable to locate the junction a little farther out on the beam, say 0.005 inch, than to have it positioned above pedestal 12 where stress decreases rapidly from maximum.

While the cantilever beam provides a convenient way of generating significant strains at the tunnel diode junction even with very small input forces, it should be understood that this is not the only possible or desirable substrate configuration. Most commonly used structural members such as torsion bars, columns, doubly supported beams, diaphragms, etc.; have a region where stress is maximized when under load. In accordance with this invention, superior strain sensitivity is achieved by using a semiconductor substrate to form such a structural member and forming a tunnel diode junction in the region of maximum stress. This approach not only yields an amplification of the force applied, but, also permits application of the force to a larger surface rather than only at the junction.

Figure 2:
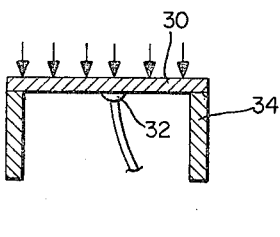
FIGURE 2 is a cross-sectional elevation of another embodiment of the invention.

In FIGURE 2 a substrate of semiconductor material has been formed as circular diaphragm 30 with tunnel diode junction 32 formed at the center. Support 34 for diaphragm 30 also serves as the electrical connection to the substrate. If fluid pressure is applied to diaphragm 30 as indicated by the arrows, the maximum deflection of diaphragm 30 will occur at its center, the location of tunnel diode junction 32. This will also be the point of maximum stress.

Figure 3:
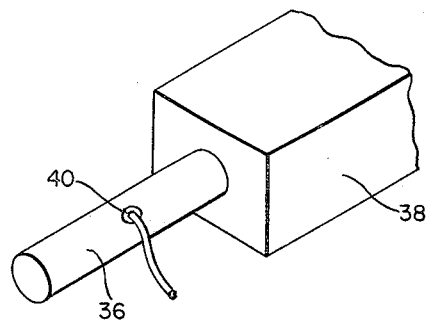
FIGURE 3 is an isometric of another embodiment of the invention.

In FIGURE 3 a substrate crystal of semiconductor material 36 is formed as a rod held in support 38 and intended to measure torque applied to it. Tunnel diode junction 40 is formed on the outer surface where the junction will experience the maximum strain as a result of applied torques.

Figure 4:
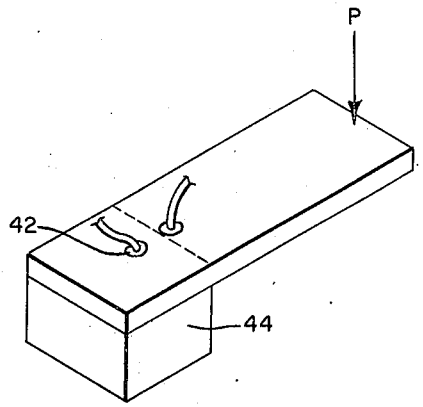
FIGURE 4 is an isometric illustrating a modification of the embodiment of FIGURE 1.

Additional modifications of the basic approach described can be made. In FIGURE 4, for example, to the cantilever beam construction of FIGURE 1 has been added an additional tunnel diode junction 42. Junction 42 is positioned directly above pedestal 44 so as to be in a region free from strain. Comparison of the outputs of the two junctions provides a means of compensating for error which may be introduced by temperature variations, for example.

Figure 5:
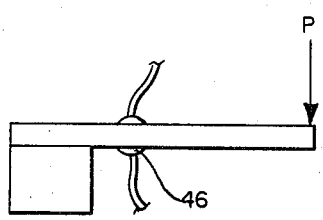
FIGURE 5 is an elevation of another modification of the embodiment of FIGURE 1.

In FIGURE 5 the cantilever beam arrangement of FIGURE 1 has been modified by providing an additional tunnel diode junction 46 below the cantilevered substrate. With this arrangement the outputs of the two junctions are subjected to equal and opposite strains so that if the outputs are subtracted, interference due to temperature which effects both junctions similarly tends to be canceled, while the applied force is effectively doubled.

Figure 6A:
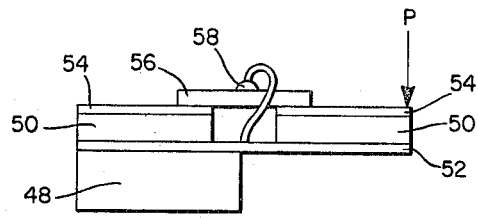
FIGURE 6A is an elevation and FIGURE 6B is a plan view of still another modification of the FIGURE 1 embodiment.
Figure 6B:
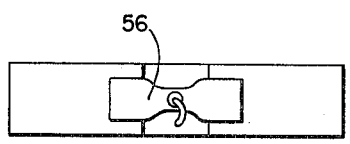

Since single crystal semiconductor substrates have relatively small physical dimensions it is sometimes desirable to build up a structural member to which force can be applied rather than applying the force directly to the substrate itself. In FIGURE 6 a built up cantilever beam is illustrated. Pedestal 48 has mounted on it a cantilever beam having an insulating center portion 50, a conducting lower portion 52 and a conducting upper portion 54. The upper conducting portion 54 has secured to it the semi-conductor substrate 56 which is notched as seen in FIGURE 6B. Tunnel diode junction 58 is formed on substrate 56 in the location described with respect to FIGURE 1. Upper conducting portion 54 provides an electrical connection to substrate 56, while lower conducting portion 52 may be connected to the other terminal of the junction. The built up beam formed in this manner can be made as large as desired to facilitate ease in handling.

Figure 7:
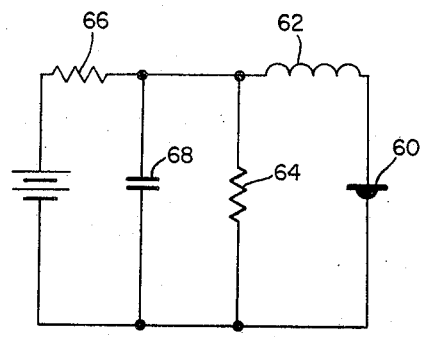
FIGURE 7 is a schematic of a circuit which may be used in employing the invention.

An important aspect of this invention is that the form of the output more readily lends itself to instrumentation and transducer type applications. In FIGURE 7 tunnel diode 60 (which might be any of the tunnel diodes used in the foregoing description) is connected in a frequency modulated transmitter circuit. Coil 62 and resistor 64 together with diode 60 function as a relaxation oscillator. Resistor 66 is used to adjust the bias across resistor 64 to a desired amount. Capacitor 68 merely serves to bypass any radio frequency from the power supply.

Common to all the previously described configurations is the fact that the strain sensitivity of the tunnel diode junction is a directional property of the substrate orientation. If the substrate is a single crystal and positioned to have strain applied in the preferred direction, enhanced sensitivity is achieved. For a p-type germanium substrate, if the junction is alloyed into a (100) face of the crystal, and the junction is strained in the [001] direction, the strain sensitivity is quite favorable. Such a device, for example, operated as a relaxation oscillator will provide frequency changes which are a linear function of junction strain so that a 500 micro inch per inch strain will cause a 2.5% frequency change. This degree of sensitivity permits full modulation of a subcarrier (viz, a change of ±7.5% of the subcarrier frequency) by application of 1500 micro in./in. strain to a junction. This is well within the strength properties of single crystal material such as germanium and silicon.

In the FIGURE 1 embodiment, if substrate 10 were a single crystal of p-type germanium, the upper surface upon which junction 18 is formed would be a (100) surface. Substrate 10 would be so oriented that the direction indicated by the arrows would be the [001] direction.

Generally, the approach described permits fabrication of rugged devices with reproducible and stable characteristics, excellent linearity, extremely low hysteresis (because the substrate is generally a single crystal material such as germanium or silicon).

What is claimed as new and desired to be secured by Letters Patent of the United States is:

1. A strain sensing arrangement comprising:
   a supporting pedestal,
   a single crystal semiconductor substrate formed as a cantilevered beam supported by said pedestal,
   said cantilevered beam having a region of maximum stress on its upper surface adjacent to said pedestal when subjected to a load at its unsupported end,
   a first tunnel diode junction formed on said substrate in said region,
   said junction being formed on the (100) surface of said substrate an strained in the [001] direction,
   a second tunnel diode junction formed on said substrate above said pedestal, and
   said first tunnel diode being connected in a circuit to provide a frequency modulated output as a function of said load.

2. A strain sensing arrangement comprising:
   a supporting pedestal,
   a single crystal semiconductor substrate formed as a cantilevered beam supported by said pedestal,
   said cantilevered beam having a region of maximum stress on its upper surface adjacent to said pedestal when subjected to a load at its unsupported end,
   a first tunnel diode junction formed on said substrate in said region,
   said junction being formed on the (100) surface of said substrate and strained in the [001] direction,
   a second tunnel diode junction formed on the opposite surface of said substrate, and
   said first tunnel diode being connected in a circuit to provide a frequency modulated output as a function of said load.

References Cited

UNITED STATES PATENTS

| | | | |
|---|---|---|---|
| 3,283,271 | 11/1966 | Persson | 73—88.5 XR |
| 3,383,907 | 5/1968 | Sikorski | 73—88.5 |
| 3,392,358 | 7/1968 | Collins | 338—2 |
| 2,866,014 | 12/1958 | Burns. | |
| 3,182,492 | 5/1965 | Sikorski | 73—88.5 |
| 3,266,303 | 8/1966 | Pfann | 73—88.5 XR |
| 3,270,555 | 9/1966 | Rindner et al. | 73—88.5 |
| 3,312,790 | 4/1967 | Sikorski. | |
| 3,327,525 | 6/1967 | Russell et al. | 73—88.5 |
| 3,328,649 | 6/1967 | Rindner et al. | |
| 3,351,880 | 11/1967 | Wilner | 73—88.5 XR |

CHARLES A. RUEHL, Primary Examiner

U.S. Cl. X.R.

73—88.5; 307—278; 317—235.